United States Patent [19]

Warmuth, II et al.

[11] Patent Number: 5,005,808
[45] Date of Patent: Apr. 9, 1991

[54] AIRSPRING END MEMBER AND AIRSPRING ASSEMBLY

[75] Inventors: Ivan J. Warmuth, II, Wapakoneta; Steven J. Moeglin, North Canton, both of Ohio

[73] Assignee: The Goodyear Tire & Rubber Company, Akron, Ohio

[21] Appl. No.: 127,123

[22] Filed: Dec. 1, 1987

[51] Int. Cl.⁵ .................. B60G 11/26; F16F 9/04
[52] U.S. Cl. ...................... 267/64.27; 267/122; 403/134
[58] Field of Search .............. 267/64.27, 64.19, 64.21, 267/64.23, 64.24, 122, 35; 403/50, 51, 134

[56] References Cited

U.S. PATENT DOCUMENTS

| | | | |
|---|---|---|---|
| 3,506,289 | 4/1970 | Gottschald | 403/51 |
| 4,105,193 | 8/1978 | Long, Jr. | 267/64.21 |
| 4,572,693 | 2/1986 | Nemoto | 403/50 |
| 4,639,159 | 1/1987 | Amrath | 403/134 |
| 4,657,229 | 4/1987 | Thurow | 267/64.27 |
| 4,718,650 | 1/1988 | Geno | 267/64.27 |

FOREIGN PATENT DOCUMENTS

| | | | |
|---|---|---|---|
| 137490 | 11/1975 | Japan . | |
| 137806 | 9/1984 | Japan | 267/64.21 |
| 1309750 | 3/1973 | United Kingdom . | |

*Primary Examiner*—Robert J. Oberleitner
*Assistant Examiner*—Mark T. Le
*Attorney, Agent, or Firm*—Marc R. Dion, Sr.

[57] ABSTRACT

An airspring end member having an improved trough area on its outer periphery for attaching a flexible tubular sleeve to the end member. The trough area has an inner diameter surface of a predetermined height with a first pair of radially, outwardly, diverging wall surfaces extending therefrom, and extending from the first pair of wall surfaces, a second pair of radially, outwardly, more diverging wall surfaces.

13 Claims, 4 Drawing Sheets

AIRSPRING END MEMBER AND AIRSPRING ASSEMBLY

FIELD OF THE INVENTION

This invention relates to airspring assemblies. More particularly, it relates to a combination of two end members, a flexible tubular sleeve and a pair of clamping rings. Most particularly, it relates to end members having on their outer periphery an improved trough area for attaching the sleeve thereto by means of the clamping ring.

BACKGROUND OF THE INVENTION

Several means have been identified which may cause the failure in operation of a rolling lobe airspring. Aside from the obvious possibility of the defectiveness of the parts themselves, the major causes of the failure of the assemblies can be attributed to the lack of proper assembly. The assembly generally involves the attachment of the flexible tubular air sleeve to an end member by means of some type of clamping ring. Generally, one end member may be an end plug while the other end member is some type of piston, however, either two end plugs or two pistons may be used in an airspring assembly.

Factors which must be balanced to determine the adequacy of the connection are the degree of compression of the sleeve between the end member and the clamping ring, the amount of surface area on the end member which is in contact with the sleeve, the ease with which the clamping ring may be crimped or swaged against the sleeve and the ease with which the given components can be held in a preassembled stage prior to the crimping stage without having a tendency to fall out of alignment with each other.

It is necessary to provide a sufficient amount of compression of the sleeve against the end member in order to provide a good air seal during the operating life of the airspring assembly. However, the amount of compression should not be so great as to cause a cutting of the air sleeve by either the clamping ring or the surface area of the end member as the airspring member is inflated and flexes through its normal operation. A considerable amount of force is exerted upon the connection during normal operation which has a tendency to try to pull the air sleeve out from between the clamping ring and the end member. Another problem occurs when either through normal operation or through other causes the clamp ring becomes dislodged from its position of being centered in the clamping area to such an extent that it can no longer seal the sleeve to the end member.

It is an object of the present invention to provide an airspring end member having a trough area which maximizes the pullout force required to remove the air sleeve between the end member and the clamping ring.

It is a further object of the present invention to provide an airspring end member having a trough area which prevents axial movement of a clamping ring used in combination therewith.

It is a still further object of the present invention to provide an airspring end member having a trough area which minimizes the possibility of cutting into the flexible tubular sleeve used in combination therewith.

It is yet another object of the present invention to provide an airspring end member having a trough area so designed as to aid in the preassembly of the airspring assembly as well as to provide the self-centering of a clamping ring used in combination therewith.

SUMMARY OF THE INVENTION

In accordance with the practice of the present invention, there is provided an airspring end member being generally cylindrical in shape, having a longitudinal axis and a trough area on its outer periphery for attaching a flexible tubular sleeve to said end member, said trough area comprising: an inner diameter surface of predetermined height, parallel to said axis, having extending from each end thereof a first pair of radially, outwardly, diverging wall surfaces and extending from said first pair, a second pair of radially, outwardly, more diverging wall surfaces.

There is also disclosed an airspring assembly comprising:

(a) a flexible tubular sleeve having two ends;
(b) a pair of clamping rings; and
(c) a pair of end members;

wherein each end member is generally cylindrical in shape, having a longitudinal axis and a trough area on its outer periphery, wherein each end of the sleeve is attached to one end member by means one of the rings and wherein said trough area comprises:

an inner diameter surface of a predetermined height, parallel to said axis, having extending from each end thereof a first pair of radially outwardly, diverging wall surfaces, and extending from said first pair, a second pair of radially, outwardly, more diverging wall surfaces.

DETAILED DESCRIPTION OF THE INVENTION

Figure 1:
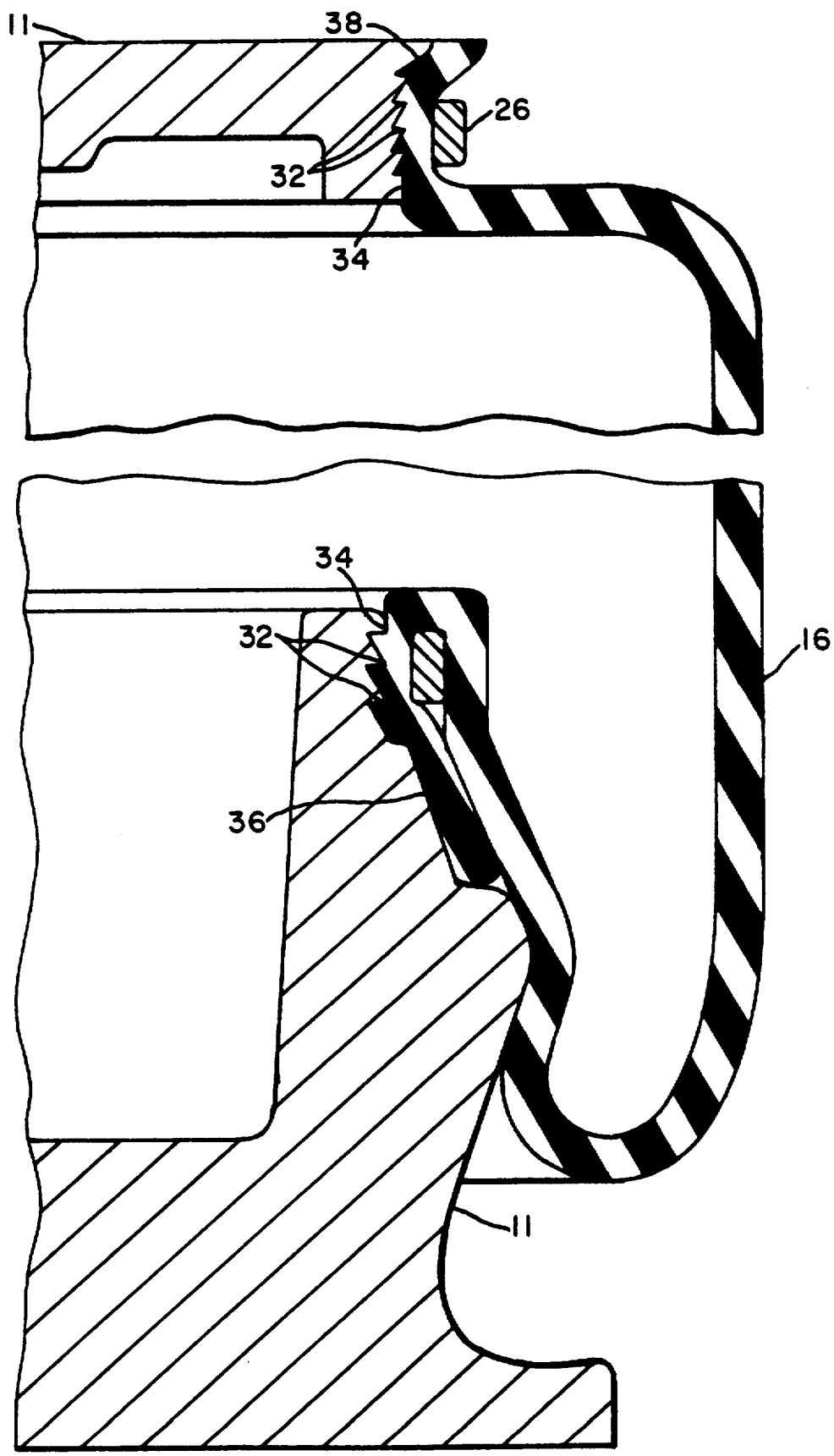
FIG. 1 is an elevational view in section showing the right half of a tubular rolling lobe type airspring according to the prior art, the airspring being substantially symmetrical about its longitudinal axis.

FIG. 1 is representative of those types of prior art airspring assemblies wherein the end members (11) have a clamp area detail characterized by a set of sawteeth (32) which operate by embedding their edges into the sleeve (16). In addition, the prior art clamp areas commonly have at least one straight wall (34) and either a sloped wall (36) or a curved wall (38). Such arrangements tend to provide a localized compression area at the point of contact between the edges of the saw teeth and the surface of the sleeve (16) which may cause a piercing or cutting of the sleeve which could lead to a failure of the assembly. In addition, these designs provide no means for self-centering of the clamping rings (26), nor to prevent the rings (26) from axial movement relative to the end member (11). Also, the height of the ring (26) in relation to the height of the clamping area is such that compression against the sleeve (16) is provided only in the radial direction.

Figure 2:
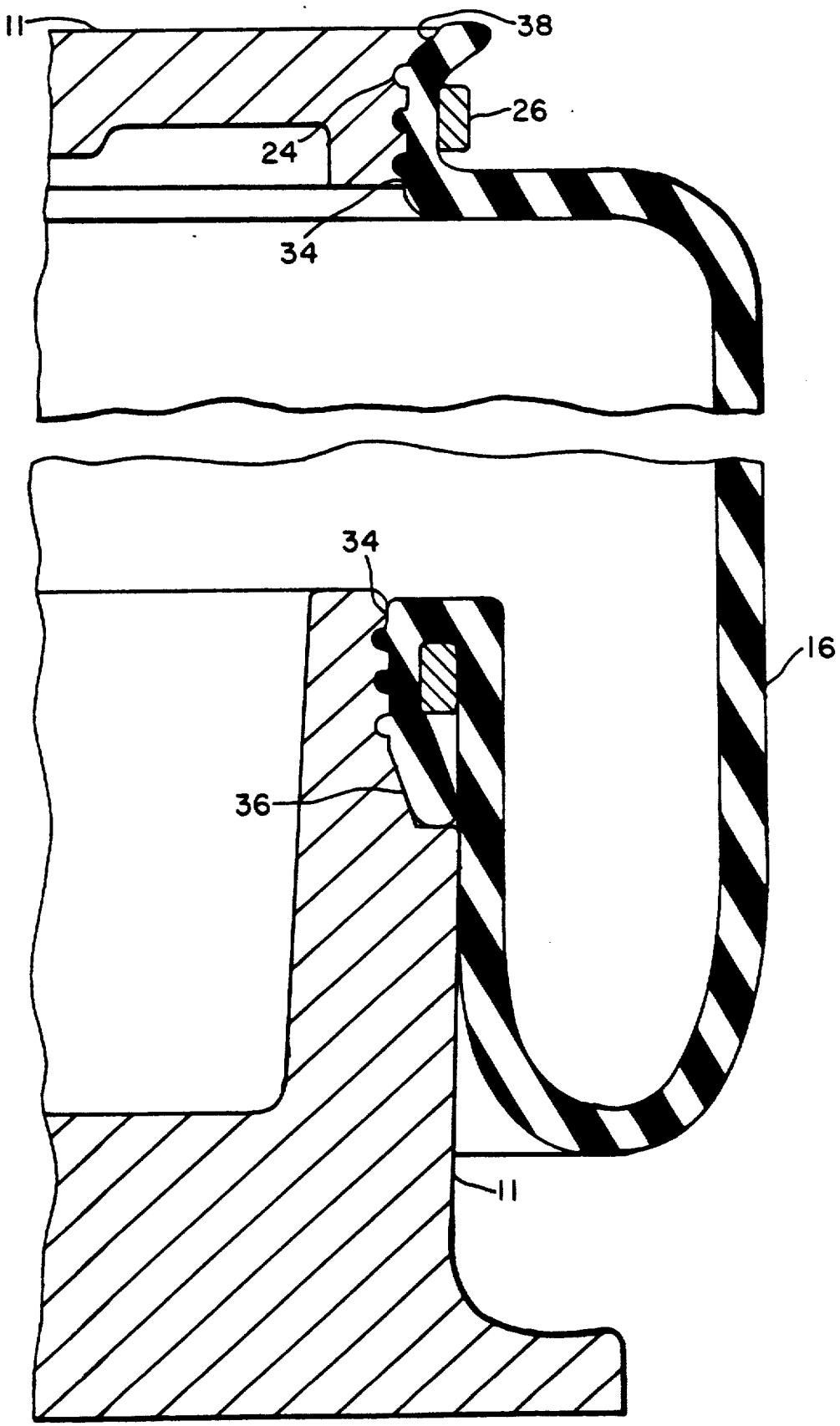
FIG. 2 is an elevational view in section showing the right half of another tubular rolling lobe type airspring according to the prior art.

FIG. 2 illustrates another type of prior art rolling lobe airspring assemblies having a clamping area detail characterized by a set of annular grooves (24) and at least one straight wall portion (34) along with either a sloped wall portion (36) or a curved wall section (38). While such a design maximizes the area of contact between the sleeve (16) and the end members (11), such designs also suffer from the disadvantage that ring member (26) provides compression in only the radial direction, and also is prone to slipping or walking relative to the end member (11) as well as not being self-centering.

Figure 3:
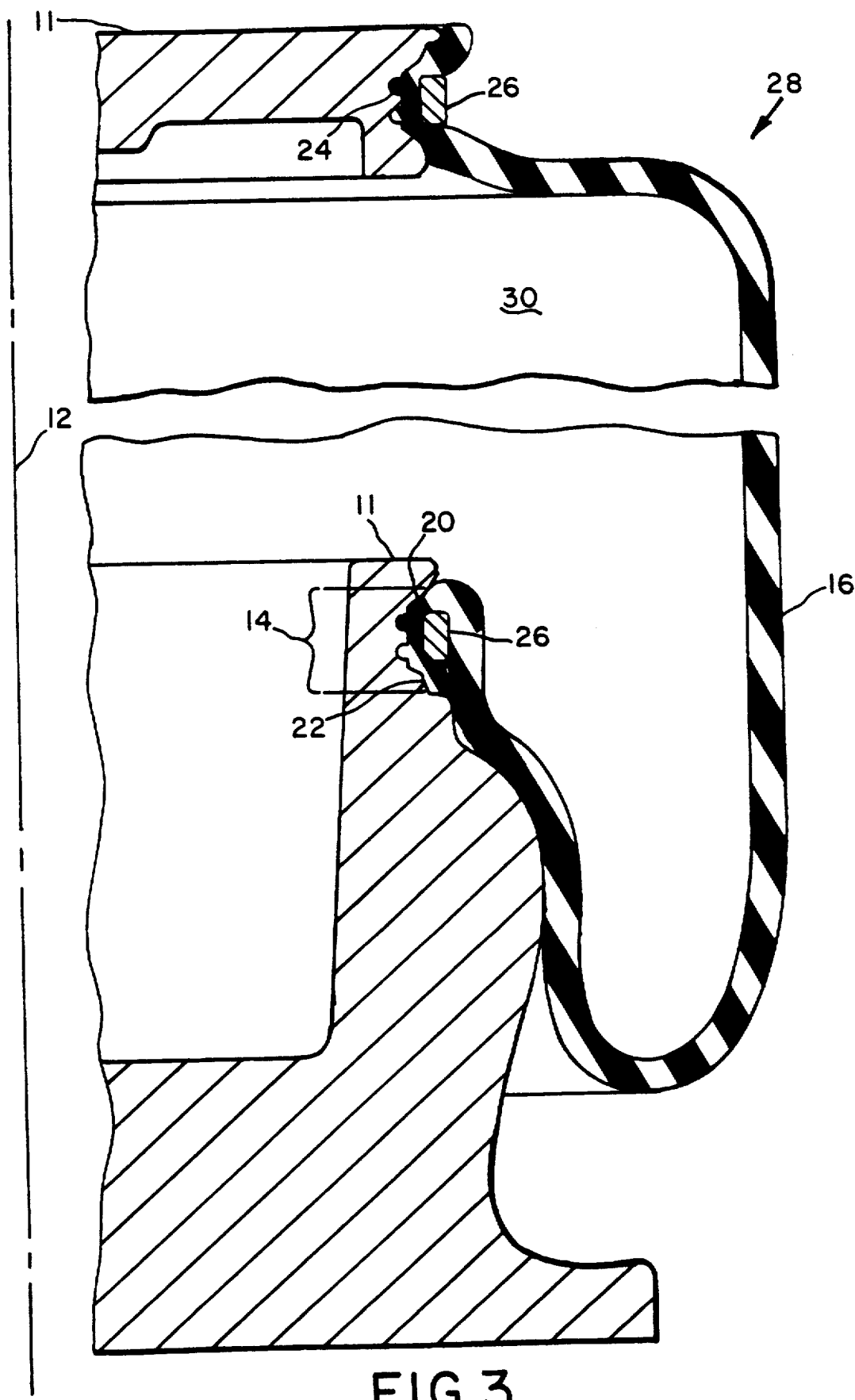
FIG. 3 is an elevational view in section showing the right half of a tubular rolling lobe type airspring according to the invention, the airspring being substantially symmetrical about its longitudinal axis.

FIG. 3 illustrates an airspring assembly according to the present invention shown generally at (28). The airspring assembly is comprised of a flexible tubular sleeve (16) having two ends; a pair of clamping rings (26); and a pair of end members (11). Each end member (11) is generally cylindrical in shape having a longitudinal axis (12) and a trough area (14) on its outer periphery. Each end of sleeve (16) is attached to one end member (11) by means of one of the rings (26) thus, forming a sealed chamber (30).

Figure 4:
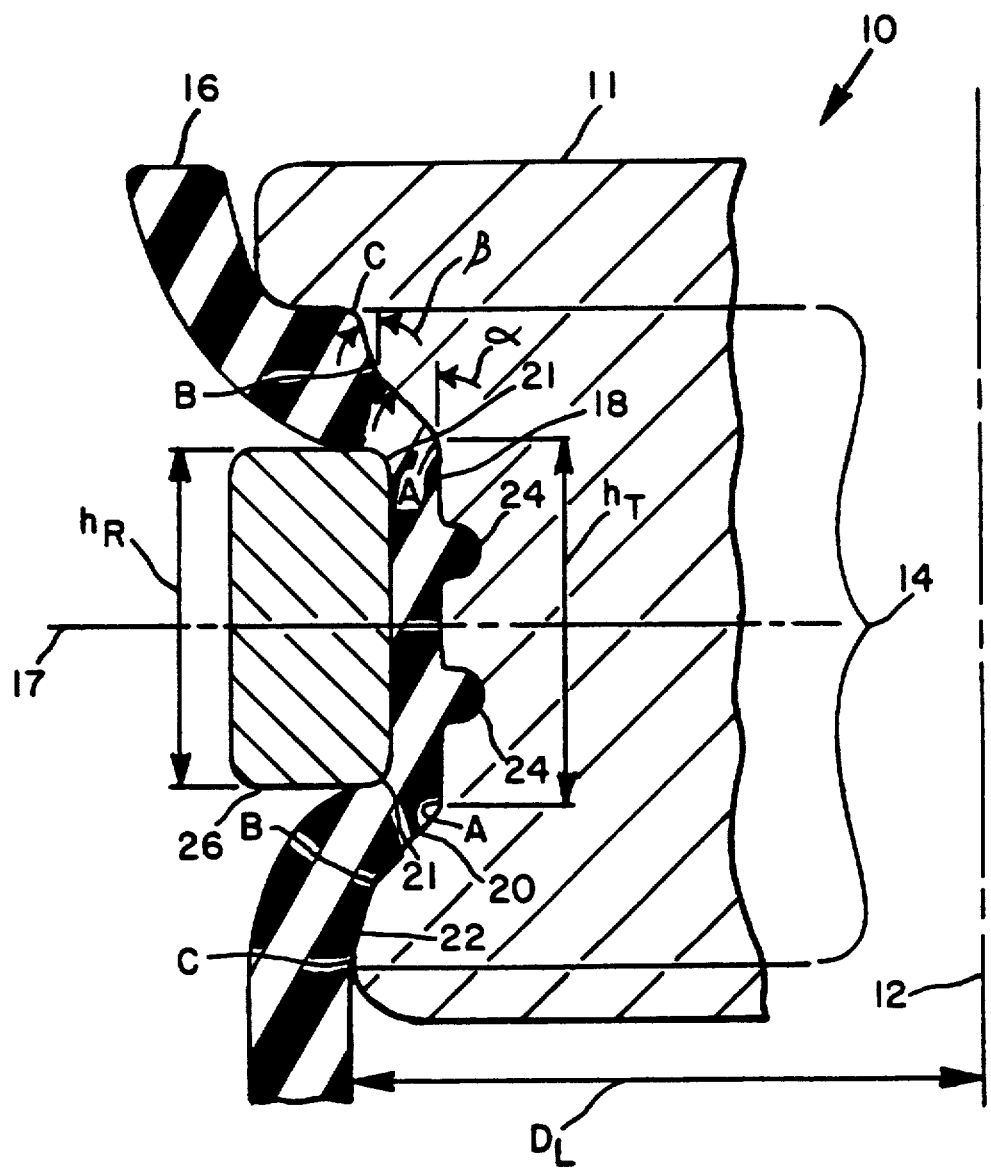
FIG. 4 is an enlarged view of a portion of FIG. 3 showing the trough area detail embodied in the present invention.

The trough area (14) can be better described with reference to FIG. 4, wherein the airspring end member assembly is denoted generally at (10). The trough area (14) of end member (11) is comprised of an inner diameter surface (18) of a predetermined height $h_T$, parallel to the axis (12). Extending from each end A of the inner diameter surface (18), is a first pair of radially, outwardly, diverging wall surfaces (20) which form an acute angle e measured from the axis. Extending from the first pair of wall surfaces (20), at point B, is a second pair of radially outwardly, more diverging wall surfaces (22) which lie at an angle $\beta$ from the longitudinal axis which is less than acute angle $\alpha$ of the first pair of wall surfaces (20). As illustrated, trough area (14) is symmetrical about a line (17) which is perpendicular to the longitudinal axis (12) and bisects the inner diameter surface (18).

Optionally, but preferably, there is provided at least one groove (24) extending radially inwardly from the inner diameter surface (18). Grooves (24) serve the dual function of not only providing additional friction area to increase the pull out value of the sleeve, but also help prevent leakage of the internal fluid particularly at operating temperatures in the lower range.

Use of an end member (11) having a trough area (14) as just described, in combination with a sleeve (16) and a clamp ring (26) which has a height $h_R$ approximately equal to the height $h_T$ of the inner diameter surface (18) provides an assembly wherein the clamp ring (26) is self-centering within the trough area by virtue of both the second pair of diverging wall surfaces (22) and the first pair of wall surfaces (20) as well as maximizes the friction contact area between points C. In addition, such an assembly provides for a maximum use of compression along the three planes, namely radial compression between the inner diameter surface (18) and the inner diameter of clamp ring (26) and the partially axial and partially radial compression forces which operate between the first pair of radially outwardly diverging wall surfaces (20) and perpendicular to the corner radii (21) of ring (26).

The smooth transition between the angle $\alpha$ of the first pair of wall surfaces (20) at point B to the angle $\beta$ of the second pair of wall surfaces (22) not only serves to prevent the possibility of cutting into sleeve (16) but also allows for the minimization of the lip diameter $D_L$. Minimization of the lip diameter $D_L$ greatly facilitates the assembly by requiring less compression of the sleeve (16) by the uncrimped ring (26) prior to the crimping operation. It is preferred that acute angle $\alpha$ for the first pair of diverging wall surfaces range from about 40 degrees to about 50 degrees. It is preferred that the more acute angle $\beta$ for the second pair of wall surfaces range from about 20 degrees to about 30 degrees.

The end members of the present invention can be made of any suitable material, for example a metal such as zinc, aluminum or stainless steel and also from a suitable thermoplastic such as nylon, PVC or ABS, generally depending upon the environment and the conditions under which they will be utilized. The end members can be produced by any well-known method such as machining, casting or molding.

The flexible tubular sleeves used in the present invention are generally made of any one of a number of polymeric materials, either thermosetting or thermoplastic or what is known as thermoplastic elastomers. Generally the sleeves used in rolling lobe type airsprings contain a plurality of layers of reinforcement imbedded within the polymeric matrix.

The clamping rings used in the present invention can be made of any one of a number of metals such as copper, stainless steel or aluminum.

Manufacturing of the airsprings of the present invention involves a pre-assembly step and a crimping step. In the pre-assembly step, either the ring is held in position on the sleeve and the end member is pushed into place or the end member is held in position within the sleeve and the ring is pulled into place. The other step for crimping the sleeve between the end member and the ring is carried out either by exerting a pre-determined amount of pressure on the ring or by crimping it to a preset dimension. Care must be taken to provide the proper amount of compression as too little compression would result in the end member being pulled out of the sleeve and/or a poor air seal between the end member and the sleeve and too much compression would result in cutting the sleeve, thus contributing to a shortened usable life. The pair of angles $\alpha$ and $\beta$ provide a self-centering ramp that gives this design a set and determined crimp point that will reduce the possibilities of a bad crimp due to high sleeve wall gauges or poor ring placement. This configuration of angles also allows for a minimum sleeve compression under the ring while still achieving a high pullout value.

While certain representative embodiments and details have been shown for the purpose of illustrating the invention, it will be apparent to those skilled in the art that various changes and modifications may be made therein without departing from the spirit or scope of the invention.

What is claimed is:

1. An airspring end member being generally cylindrical in shape having a longitudinal axis and a trough area on its outer periphery for attaching a flexible tubular sleeve to said end member, said trough area comprising:

an inner diameter surface of a predetermined height, parallel to said axis, having extending from two ends thereof a first pair of radially, outwardly, diverging wall surfaces, and extending from said first pair, a second pair of radially, outwardly, more diverging wall surfaces.

2. The end member according to claim 1 wherein said trough area is symmetrical about a line which is perpendicular to said axis and bisects said inner diameter surface.

3. The end member according to claim 2 wherein said trough area further comprises at least one groove extending radially inwardly from said inner diameter surface.

4. The end member according to claim 1 wherein said first pair of wall surfaces diverge at an acute angle measured from said axis and said second pair of wall surfaces diverge at an angle less than said acute angle when measured from said axis.

5. The end member according to claim 4 wherein said acute angle ranges from about 40 degrees to about 50 degrees.

6. The end member according to claim 5 wherein the angle of said second pair of wall surfaces ranges from about 20 degrees to about 30 degrees from the axis.

7. An airspring assembly comprising:
 (a) a flexible tubular sleeve having two ends;
 (b) a pair of clamping rings; and
 (c) a pair of end members; wherein each end member is generally cylindrical in shape having a longitudinal axis and a trough area on its outer periphery, wherein each end of the sleeve is attached to one end member by means of one of the rings and wherein said trough area comprises: an inner diameter surface of a pre-determined height, parallel to said axis, having extending from two ends thereof a first pair of radially, outwardly, diverging wall surfaces, and extending from said first pair, a second pair of radially, outwardly, more diverging wall surfaces.

8. The assembly according to claim 7 wherein said clamps have a height approximately equal to the height of said inner diameter surface.

9. The airspring assembly according to claim 7 wherein said trough area is symmetrical about a line which is perpendicular to said axis and bisects said inner diameter surface.

10. The airspring assembly according to claim 9 wherein the trough area further comprises at least one groove extending radially inwardly from said inner diameter surface.

11. The assembly according to claim 7 wherein said first pair of wall surfaces diverge at an acute angle from said axis and said second pair of wall surfaces diverge at an angle less than said acute angle when measured from said axis.

12. The assembly according to claim 11 wherein said acute angle ranges from about 40 degrees to about 50 degrees.

13. The assembly according to claim 12 wherein the angle of said second pair of wall surfaces ranges from about 20 degrees to about 30 degrees from the axis.

* * * * *